United States Patent
Reeves

(10) Patent No.: US 7,322,614 B2
(45) Date of Patent: Jan. 29, 2008

(54) MOTOR VEHICLE EXHAUST PIPE REPAIR DEVICE

(76) Inventor: Daniel Reeves, 642 Louisa Lane Extension, Charlestown, MD (US) 21901

( * ) Notice: Subject to any disclaimer, the term of this patent is extended or adjusted under 35 U.S.C. 154(b) by 172 days.

(21) Appl. No.: 11/174,054

(22) Filed: Jul. 2, 2005

(65) Prior Publication Data
US 2007/0001445 A1 Jan. 4, 2007

(51) Int. Cl.
F16L 55/00 (2006.01)

(52) U.S. Cl. .................. 285/15; 285/420; 138/97

(58) Field of Classification Search .............. 285/15, 285/420, 412; 248/62, 67, 68.1, 71, 72, 73, 248/74.1; 138/97, 99
See application file for complete search history.

(56) References Cited

U.S. PATENT DOCUMENTS

| | | | |
|---|---|---|---|
| 3,199,815 A * | 8/1965 | Martinkovic et al. ......... 248/62 |
| 3,960,232 A | 6/1976 | Hubbell, III | |
| 4,209,155 A | 6/1980 | Florian | |
| 4,275,489 A | 6/1981 | Johansson et al. | |
| 4,492,391 A * | 1/1985 | Haines ........................ 285/114 |
| 4,635,970 A * | 1/1987 | Haines ........................ 285/114 |
| 4,696,368 A | 9/1987 | Hummel et al. | |
| 4,730,852 A | 3/1988 | Arscott | |
| 4,866,933 A | 9/1989 | Kao | |
| 5,961,153 A | 10/1999 | Foster | |
| 6,467,811 B2 * | 10/2002 | Mitchell ........................ 285/15 |
| 6,775,890 B2 * | 8/2004 | Kolarik ........................ 29/235 |
| 2004/0060763 A1 | 4/2004 | Stodolka | |
| 2004/0089493 A1 | 5/2004 | Chae | |

* cited by examiner

Primary Examiner—David Bochna
(74) Attorney, Agent, or Firm—Ober/Kaler; Royal W. Craig

(57) ABSTRACT

A device for repairing automobile, and other vehicle, exhaust pipes that have been broken. The device comprises three major components, four sections of angle steel, four U-bolts, and two thread bolts. The angle steel sections form a trough and a cap. In use, the broken exhaust pipe lies inside the trough formed by the first two sections of angle steel and snugly nestles into the angle. The U-Bolts hold the angle steel in place and each angle steel section can move along the thread bolts. The U-Bolt is tightened where the break in the exhaust pipe exists. The U-Bolt may also be loosened to allow the two exhaust pipe pieces to be pulled apart. The device allows for a clean repair of an exhaust pipe without the need for tape, hangers, welding, or other temporary and/or inefficient measures.

9 Claims, 1 Drawing Sheet

MOTOR VEHICLE EXHAUST PIPE REPAIR DEVICE

BACKGROUND OF THE INVENTION

1. Field of the Invention

The present invention relates to motor vehicle improvement parts, and, more particularly, to an exhaust pipe repair device that provides a clean and effective repair without the need for tape, hangers, welding, or other temporary measures.

2. Description of the Background

Automobile and other motor vehicle exhaust pipes are subject to corrosion and extreme wear and tear after a period of extended use which, over time, leads to breakage. The break may begin as a corroded hole in the pipe that continues to get larger until the pipe breaks in two, causing the muffler to drag or fall off, loud noise, and general inconvenience. One costly remedy entails replacing the entire exhaust pipe system. While this cost varies depending upon the make and age of the vehicle, the low end is in the $500 range and for some vehicles can go as high as $2000 or more. Replacing the entire system may be unnecessary for a break in the pipe, when the remainder of the system may not be damaged. Therefore, a variety of methods and devices have been developed for repairing an exhaust pipe, from simple home repair using drink cans and duck tape to more complex devices.

For example, U.S. Pat. No. 5,961,153 to Foster discloses an exhaust repair kit for mounting a damaged pipe end to a flanged pipe end, comprising a length of tubing with a first and second portion. The first portion is sized to engage about the outer circumference of the damaged pipe end and the second portion has an inside diameter less than the outside diameter of the damaged pipe end. A U-bolt assembly fastens about the outer circumference of the first portion to secure the first portion tightly to the damaged pipe end.

U.S. Pat. No. 4,730,852 to Arscott shows a vehicle exhaust repair device for holding together the abutting ends of two axially-aligned pipe sections and supporting those abutting ends from a support collar. The device includes a collar mounted on each pipe section and a fastener means to extend between the two collars to secure the two collars together and to support the collar of the exhaust system.

U.S. Pat. No. 4,696,368 to Hummel et al. discloses a method of protecting a vehicle exhaust system comprising a heavy gauge steel tube that fits over the tail pipe.

U.S. Pat. No. 4,209,155 to Florian shows a heavy duty bracket and hanger assembly for an exhaust pipe that includes a bracket with a U-shaped body that terminates in oppositely extending flange portions. The legs of the body portion have closed apertures that receive the bight member. The exhaust pipe then fits within the cylindrical space defined by the bracket U-shaped clam and clamp keeper.

U.S. Patent Application Serial No. 2004089493 by Chae discloses a fixing device for an automobile muffler comprising a diagonally angled resilient hanger. The rear part of the resilient hanger is attached with a cover bracket and a body side bracket. The cover bracket is formed with a vertical flange surface and the body side bracket is formed with a vertical protrusion surface.

Although all of the aforementioned examples address vehicle exhaust pipe repair devices, they are either too cumbersome, too expensive, or inefficient. Moreover, none of the prior art devices provide a means to remove a crimp caused by prior bolts or include an angle steel trough with thread bolt and cap to repair and protect the exhaust pipe.

Therefore, it would be advantageous over the prior art to provide an improved vehicle exhaust pipe repair device comprised of three major sets of components: four sections of angle steel, four U-bolts, and two thread bolts. In use, two of the sections of angle steel form a trough in which the exhaust pipe rests and the other two sections of angle steel form a cap over the exhaust pipe. The U-Bolt is tightened or loosened to hold the pipe together or pull it apart. The thread bolts enable the angle steel sections to move together and apart, allowing for a clean and effective repair of the exhaust pipe without the need for tape, hangers, welding, or other temporary measures.

SUMMARY OF THE INVENTION

It is, therefore, the primary object of the present invention to provide a vehicle exhaust pipe repair device that is inexpensive, economical and easy to manufacture.

It is still another object to provide a vehicle exhaust pipe repair device that is durable and will withstand excessive use of the vehicle.

It is yet another object to provide a vehicle exhaust pipe repair device that will allow a broken pipe to be repaired as well as pull apart a crimped pipe.

It is another object to provide a vehicle exhaust pipe repair device that effectively and efficiently corrects the problem of a broken vehicle exhaust system without resorting to known temporary measures.

The above objects are accomplished by providing vehicle exhaust pipe repair device comprised of three major sets of components, i.e., four sections of angle steel, four U-bolts, and two thread bolts, wherein two of the sections of angle steel form a trough in which the exhaust pipe rests and the other two sections of angle steel form a cap over the exhaust pipe, the U-Bolts control holding the pieces of the pipe together, and the thread bolts control the movement of the angle steel, allowing for a clean and effective repair of the exhaust pipe without the need for tape, hangers, welding, or other temporary measures.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

The present invention is a motor vehicle exhaust pipe repair device that will repair a broken exhaust pipe, join two pieces of exhaust pipe, or pull apart a crimped exhaust pipe.

Figure 1:
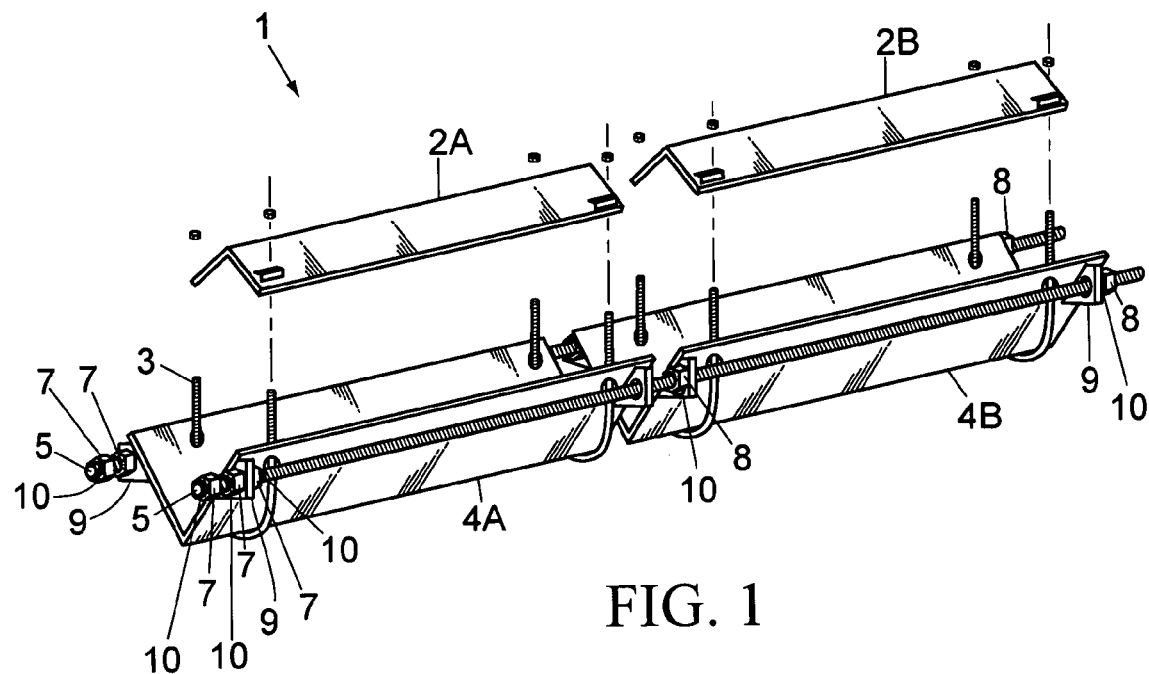
FIG. 1 is an exploded view of the motor vehicle exhaust pipe repair device of the present invention.

Referring to FIG. 1, the motor vehicle exhaust pipe repair device 1 is shown to comprise three major component-groups: 1) four sections of angle steel 4A, 4B, 2A, 2C; 2) four U-Bolts 3, and 3) two elongate thread bolts 7. Two of the sections of angle steel 4A and 4B are placed end to end to form a trough.

The two lower sections 4A, 4B are trough sections each comprising a strip of steel 4 approximately three inches long, approximately two-inches wide, and angled lengthwise at a right angle to form a 1" wide trough. The four corners of each trough section 4A, 4B are defined by through-holes. The two upper sections 2A, 2B are inverted cap sections each comprising a strip of steel 2 approximately three inches long, narrower than the trough sections 4A and 4B, and angled lengthwise at a right angle to form a cap that fits down inside the trough sections. The four corners of each cap section 2A, 2B are defined by oblong notches as shown.

A pair of U-Bolts 3 join together each cap section 2A, 2B with a corresponding trough section 4A, 4B, the ends of U-bolts 3 passing upward through the through-holes at the corners of the trough sections 4A & 4B and upward through the notches in the corners of each cap section 2A, 2B. The U-Bolts 3 are secured thereto by conventional hex nuts and thereby hold together each cap section 2A, 2B with its corresponding trough section 4A, 4B. To give the hex nuts a flush abutment surface, four angle brackets 13 (each having a corresponding through-bore) may be welded over the notches in each cap section 2A & 2B as seen in FIG. 2 to form a horizontal abutment for the hex nuts.

Laterally-protruding corner tabs 9 are welded to (or may be punched from) each of the corners of each trough section 4A and 4B, corner tabs 9 being vertically-oriented, protruding laterally, and defined by a central through-hole. Cap section 2A and corresponding trough section 4A is aligned end-to-end with cap section 2B and corresponding trough section 4B. A thread bolt 5 is threaded through the holes in the four aligned tabs 9 on each side of the trough sections 4A and 4B, thereby maintaining the end-to-end alignment of cap section 2A/trough section 4A with cap section 2B/trough section 4B. A hex nut 7 is secured to one end of each of the thread bolts 5 on the outside face of each tab 9, thereby fixing the relative axial positions. The hex nut 7 is welded to the thread bolts 5 via a tack weld 10 to keep from sliding through the tab 9. The hex nuts 8 are not welded to the thread bolts 5, but welded to tab 9 via a tack weld 10 at the opposite end of the thread bolt 5, and loosening the nut 8 allows each angle steel section 4A, 4B to move along the thread bolts so that the inside ends of the angles steel trough sections 4A, 4B meet and can be pulled apart.

Figure 2:
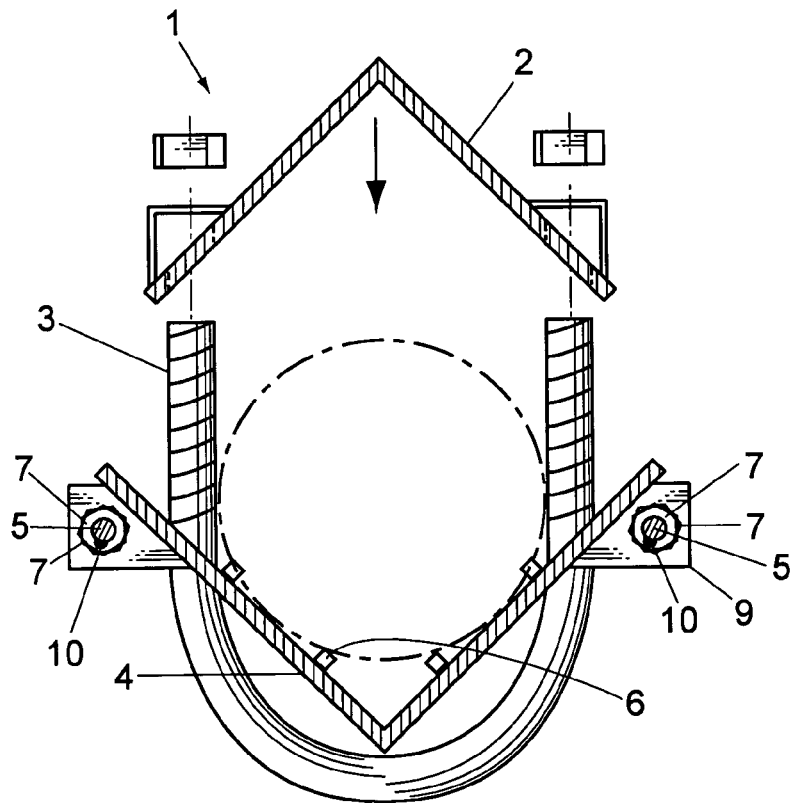
FIG. 2 is a cross-sectional view of the motor vehicle exhaust pipe repair device of FIG. 1.

Referring now to FIG. 2, the inside portion of the angle steel trough sections 4A, 4B is defined by a series of parallel-spaced nodules 6 spaced, for example, approximately one inch apart. The nodules 6 may be formed by bead-welding, machining or other suitable means.

In using the motor vehicle exhaust pipe repair device of the present invention, an exhaust pipe (see dotted lines) is cradled inside the trough sections 4A, 4B, the cap sections 2A, 2B are laid over the corresponding trough sections 4A, 4B, and U-Bolts 3 are loosely inserted through both. By virtue of the combination of angle and nodules 6, the exhaust pipe nestles snugly and firmly down into the angle. The entire assembly may be conveniently positioned by loosening the nuts 8, which allows each angle steel trough section to move along the thread bolts 5. The entire assembly is locked with the exhaust pipe therebetween by tightening the U-Bolts 3.

Moving the angle steel trough sections 2A, 4A and 2B, 4B apart serves to pull the exhaust pipe apart to remove a crimp, and this can be done by adjusting the hex nuts 8 with a wrench.

Pushing the angle steel trough sections together to abut in the center and, if necessary, tightening the U-Bolts 3 allows two separate sections of exhaust pipe to be cohesively joined together, either to repair a broken exhaust pipe or to join two separate pipe sections together. This can likewise be done by adjusting the hex nuts 8 with a wrench.

It should now be apparent that the vehicle exhaust pipe repair device according to the present invention allows for a clean repair of a broken exhaust pipe without the need for tape, hangers, welding, or other temporary and/or inefficient measures, removes crimping caused by previous tightened U-Bolts 3, and effectively joins two sections of exhaust pipe.

In light of the foregoing, it is apparent that the motor vehicles exhaust pipe repair device 1 is particularly designed to improve the quality and expense of an exhaust pipe repair job, while making the repair work less cumbersome than the usual methods.

Having now fully set forth the preferred embodiment and certain optional modifications of the concept underlying the present invention, various other embodiments as well as certain variations and modifications of the embodiment herein shown and described will obviously occur to those skilled in the art upon becoming familiar with said underlying concept. It is to be understood, therefore, that the invention may be practiced otherwise than as specifically set forth in the appended claims.

I claim:

1. A motor vehicle exhaust pipe repair device, comprising:
   two trough sections of angled steel each defined by laterally-protruding tabs at the corners,
   two cap sections of angled steel each adapted to nest within a corresponding trough section;
   four U-Bolts, each pair of U-bolts for joining a cap section of angled steel to corresponding trough section proximate the ends; and
   two thread bolts each inserted through the corner tabs along each side of both trough sections to join said two trough sections together end-to-end;
   wherein the adjoining trough sections of angle steel form an elongate trough in which an exhaust pipe may be seated, the two cap sections of angle steel forming a cap over the exhaust pipe, and the four U-Bolts securing said exhaust pipe therebetween.

2. The motor vehicle exhaust pipe according to claim 1, wherein each of said trough sections of angle steel are three inches by two inches.

3. The motor vehicle exhaust pipe according to claim 1, wherein each of said thread bolts is in the range of 10 to 12 inches.

4. The motor vehicle exhaust pipe according to claim 1, wherein each of said U-Bolts is in the range of two to three inches.

5. The motor vehicle exhaust pipe according to claim 1, wherein each of said angle steel sections that form the cap is bolted to each of the angle steel sections that form the trough.

6. A motor vehicle exhaust pipe repair device, comprising:
   a first and second section of angle steel joined by a first and second thread bolt to form a trough in which two ends of a broken exhaust pipe nestles;
   a third and fourth section of angle steel inverted over the exhaust pipe, said third and fourth section of angle steel each being bolted by a pair of U-bolts to said first and second sections of angle steel, respectively, to form a cap over the exhaust pipe with said U-bolts securing said exhaust pipe between said trough and said cap; and;
   a first and second hex nut, each welded to an outward end of said trough; and said first and second thread bolt placed adjacent to each side of said trough, wherein said first and second hex nuts secure one end of each of the first and second thread bolts to an outward end of said trough, the opposing end of said thread bolts being attached to an opposing end of said trough;

wherein the exhaust pipe nestles snugly in said trough, and said first and second hex nuts are tightened onto the respective first and second thread bolts to join two ends of said broken exhaust pipe and said first and second hex nuts are loosened on the respective first and second thread bolts to disjoin the two ends of said broken exhaust pipe.

7. The motor vehicle exhaust pipe according to claim 6, wherein each of said angle steel sections is three inches by two inches.

8. The motor vehicle exhaust pipe according to claim 6, wherein each of said thread bolts is in the range of 10 to 12 inches.

9. The motor vehicle exhaust pipe according to claim 6, wherein each of said U-Bolts is in the range of two to three inches.

* * * * *